United States Patent
Hama et al.

(10) Patent No.: US 8,891,837 B2
(45) Date of Patent: Nov. 18, 2014

(54) NONCONTACT BIOMETRIC IDENTIFICATION DEVICE

(71) Applicant: Fujitsu Limited, Kawasaki (JP)

(72) Inventors: Soichi Hama, Atsugi (JP); Takahiro Aoki, Kawasaki (JP); Mitsuaki Fukuda, Sagamihara (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 13/849,289

(22) Filed: Mar. 22, 2013

(65) Prior Publication Data

US 2013/0259328 A1 Oct. 3, 2013

(30) Foreign Application Priority Data

Mar. 27, 2012 (JP) ................. 2012-072570

(51) Int. Cl.
G06K 9/00 (2006.01)
(52) U.S. Cl.
CPC .................. G06K 9/00087 (2013.01)
USPC ........................ 382/124; 340/5.83
(58) Field of Classification Search
CPC ................................. G06K 9/00087
USPC ........... 382/115, 124; 340/5.82–5.84; 356/71; 283/68
See application file for complete search history.

(56) References Cited

U.S. PATENT DOCUMENTS

| | | | | |
|---|---|---|---|---|
| 8,184,866 B2 * | 5/2012 | Takaku et al. ............. | 382/115 |
| 8,245,879 B2 * | 8/2012 | Wegelin .................... | 222/52 |
| 2004/0017934 A1 * | 1/2004 | Kocher ..................... | 382/125 |
| 2005/0129290 A1 | 6/2005 | Lo et al. | |
| 2006/0023919 A1 | 2/2006 | Okamura et al. | |
| 2006/0291701 A1 * | 12/2006 | Tanaka ..................... | 382/115 |
| 2009/0290763 A1 | 11/2009 | Abe | |
| 2010/0165090 A1 | 7/2010 | Sweeney et al. | |
| 2012/0121141 A1 * | 5/2012 | Miura et al. ............... | 382/115 |

FOREIGN PATENT DOCUMENTS

| | | |
|---|---|---|
| EP | 1071034 A2 | 1/2001 |
| EP | 1816587 A1 | 8/2007 |
| JP | 2006-42880 | 2/2006 |
| JP | 2007-4321 | 1/2007 |
| JP | 2007-521577 | 8/2007 |
| JP | 2009-282706 | 12/2009 |

OTHER PUBLICATIONS

Extended European Search Report dated Apr. 28, 2014 for the corresponding European Patent Application No. 13160590.9, 9 pages.

* cited by examiner

*Primary Examiner* — Samir Ahmed

(74) *Attorney, Agent, or Firm* — Fujitsu Patent Center

(57) ABSTRACT

A biometric identification device acquires enrollment data in such a manner as to improve usability while maintaining identification accuracy. The noncontact biometric identification device includes: a sensor that detects feature data including a feature of a part of a living body at a plurality of positions in a range defined in advance in a real space when the part of the living body moves in the range to acquire enrollment data; a processor that arranges a specified number of hyperspheres in a comparison range along a line defined by a locus of the living body in the real space such that the hyperspheres run over the comparison range, do not overlap one another, and have maximum radii, and then selects the feature data detected at one of the positions in the real space closest to the position corresponding to the center of one of the hyperspheres as the enrollment data.

11 Claims, 21 Drawing Sheets

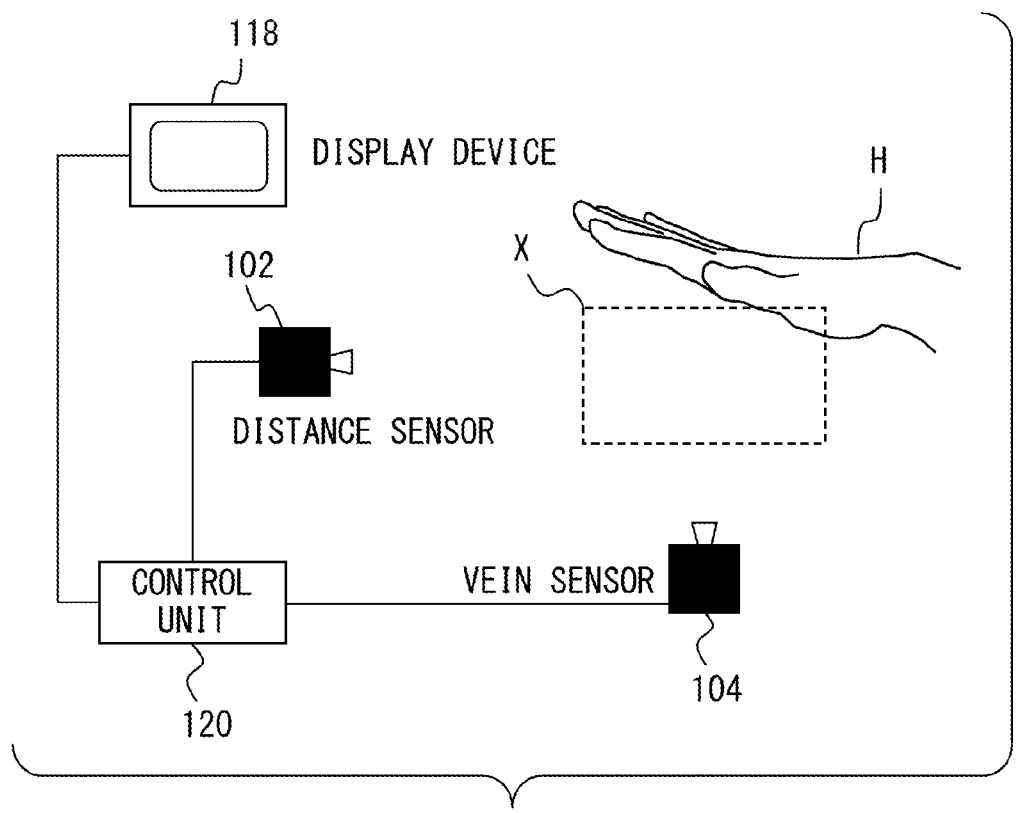
F I G. 1

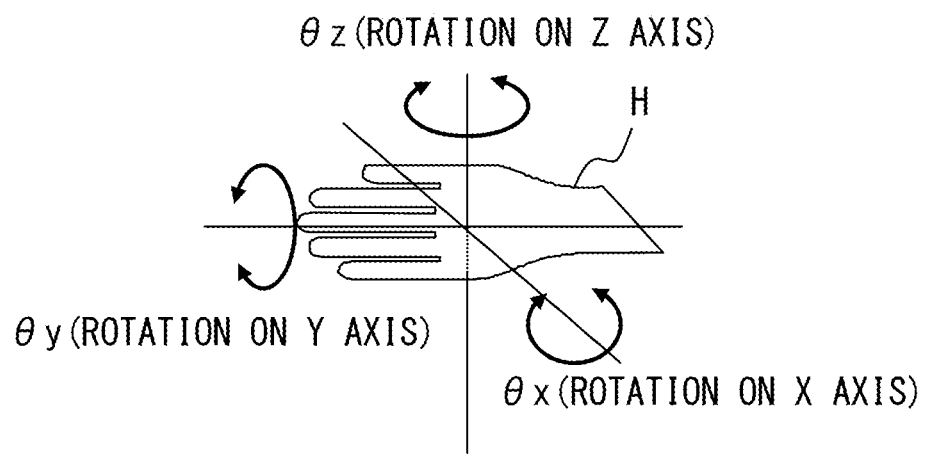
F I G. 3 B

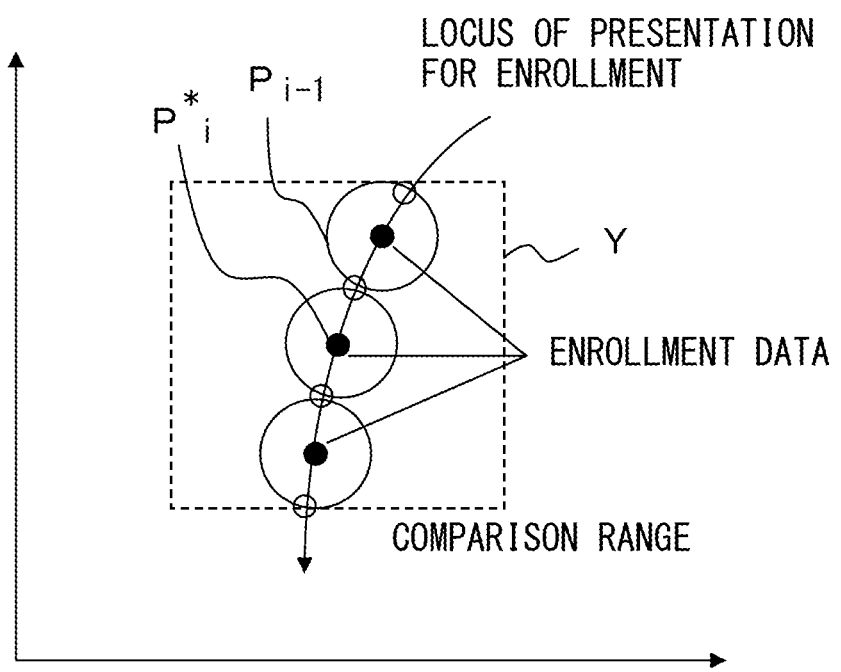
F I G. 5

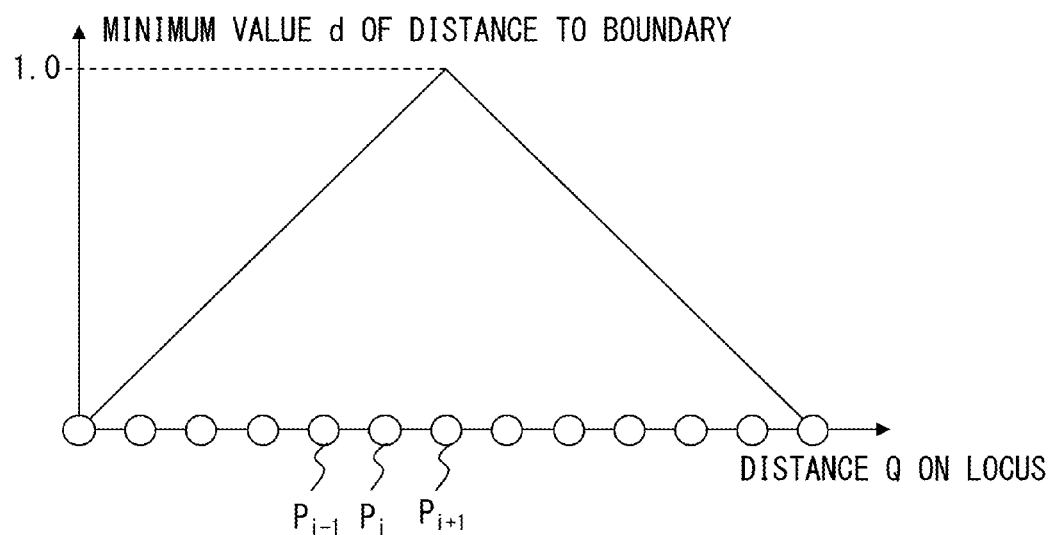
F I G. 9

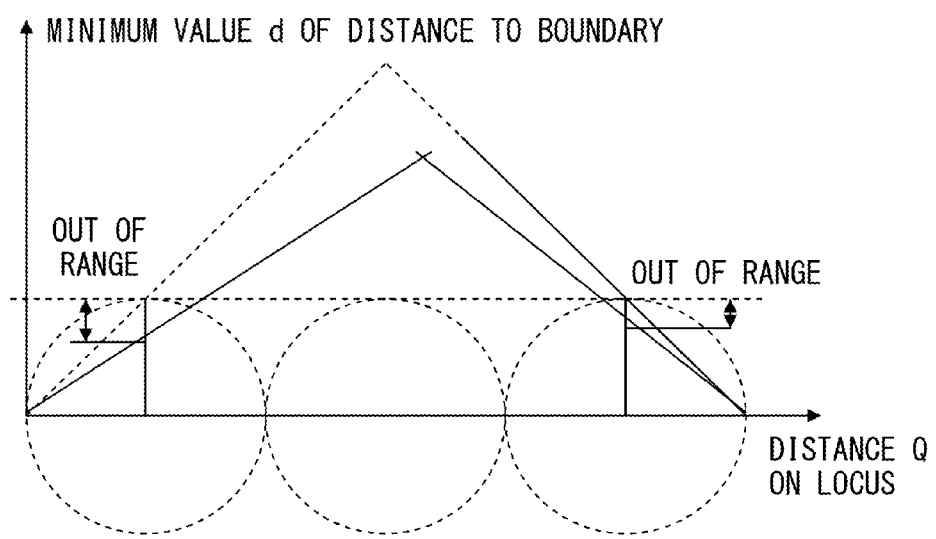
F I G. 1 1

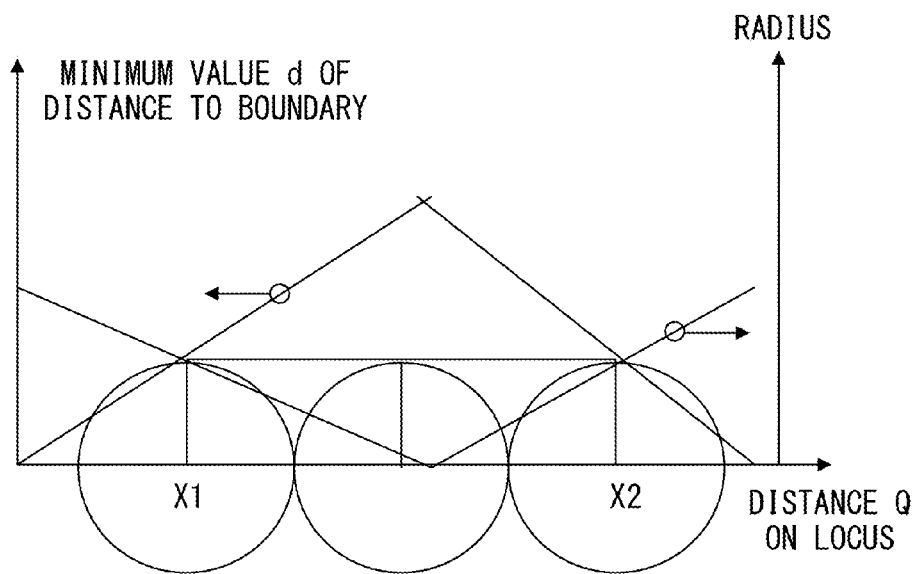
F I G. 1 4

NONCONTACT BIOMETRIC IDENTIFICATION DEVICE

CROSS-REFERENCE TO RELATED APPLICATIONS

This application is based upon and claims the benefit of priority of the prior Japanese Patent Application No. 2012-072570, filed on Mar. 27, 2012, the entire contents of which are incorporated herein by reference.

FIELD

The embodiments discussed herein are related to a noncontact biometric identification device.

BACKGROUND

The noncontact biometric identification device authenticates a user using his or her biometric features, such as the fingerprints, face, veins, etc. With the biometric identification device, the biometric features of a person to be authenticated are registered as enrollment data in advance. When it is necessary for a user to be authenticated, the acquired biometric features are compared with the enrollment data. If they match each other, the user is authenticated. For example, with the vein pattern used in the palm vein identifying method, the markings which appear as the nets of veins are processed as a pattern, and the pattern included in the enrollment data which is registered in advance is compared with the pattern read upon the authentication, thereby authenticating the user. The biometric features of a person fluctuate depending on the state of a living body, such as the age, the condition of a body, etc., and the acquisition state. Therefore, it is necessary to perform comparison with the fluctuations considered. However, if the fluctuation is underestimated, there occurs a no-authentication error (false rejection error). If the fluctuation is overestimated, there occurs a wrong-user acceptance error (false acceptance error). To suppress the fluctuation as much as possible, it is preferable to perform comparison in the same state as the enrollment state. Therefore, a normal biometric identification product acquires biometric information a plurality of times and provides variations in enrollment data, thereby suppressing the fluctuation.

In a palm vein authentication, a noncontact identifying operation is performed without a sensor being touched by a user's hands. In this case, since a vein image is acquired with a user's handheld in the air, the fluctuation of the hand posture (position, tilt, etc.) easily becomes larger in comparison with other modalities. Then, when a user's hand is held on the sensor, there may be a method of introducing the hand to the optimum position while detecting the posture of the held hand so that the optimum state of the posture may be maintained. However, since the method forces the user to hold the hand in a particular posture, the usability is degraded.

On the other hand, when vein images are continuously captured while trailing the moving hand, and compared with appropriate images, the usability may be substantially improved while maintaining high identification accuracy. In this case, it is important to use an appropriate method of selecting enrollment images. If a method of capturing an image with the user's hand in a static position during registration is used, there occurs the problem of degradation in accuracy when a non-optimum image is registered. Furthermore, a change in posture due to having different operating methods between registration and collation may cause a degradation in accuracy.

When a moving hand is continuously captured and compared, it is preferable that a enrollment image be selected from among a set of images obtained by continuously capturing images. The technology of automatically selecting and using an image which is assumed to be the optimum image is loaded into, for example, a digital camera which is loaded with a face identifying system, etc. Even in the biometric identification field, some techniques of selecting the optimum image from among a plurality of acquired images and using the image have been proposed.

For example, it is a well-known technique to capture a plurality of images of biometric features of a face, etc., and record some highly similar images as enrollment images among the captured images.

There are also well-known techniques to have variations by thinning highly similar images by calculating the similarity among images, and to have variations of rotation angles by continuously capturing fingers uncurled in a flat state.

However, in the technique of recording as enrollment data a highly similar image from a plurality of images, the purpose of providing variations to collect highly similar images is not fulfilled.

In addition, in the technique of thinning highly similar images after calculating the similarity among images, and providing variations in rotation angle after continuously capturing fingers uncurled in a flat state, a one-dimensional evaluation criterion is used, and it is difficult to apply the technique when data indicates a multidimensional degree of freedom as in the noncontact palm vein identification. Furthermore, in the noncontact biometric identification device, since different operations are performed between enrollment and comparison of enrollment data, it is not certain that enrollment data appropriate for comparison will be obtained without fail.

In addition, each time a user holds his or her hand for user authentication above the noncontact biometric identification device, the position and direction of the hand easily fluctuates, or the background image is taken undesirably because the hand does not completely cover the capturing area, and thereby various images are acquired undesirably. To successfully authenticate a user by comparing and comparing the acquired images with enrollment data, the enrollment data must have large variations. However, it is difficult to systematically provide such enrollment data.

[Patent Document 1] Japanese Laid-open Patent Publication No. 2007-4321
[Patent Document 2] Japanese Laid-open Patent Publication No. 2007-521577
[Patent Document 3] Japanese Laid-open Patent Publication No. 2009-282706

SUMMARY

A noncontact biometric identification device includes: a sensor that detects feature data including a feature of a part of a living body at a plurality of positions in a range defined in advance in a real space when the part of the living body moves in the range to acquire enrollment data, wherein the feature data is linked to position data relating to the plurality of the positions in the range and to posture data about a posture of the part of the living body at the plurality of positions while detection; a processor that arranges a specified number of hyperspheres in a comparison range defined in advance in a feature space along a line defined by a locus of the living body in the real space, wherein the feature space is spanned by a coordinate specifying a position of the part of the living body in the real space and a variable specifying the posture of the part of the living body, and the collation range includes a space corresponding to the range in the real space and a space corresponding to a space covered by the posture detected by the sensor, such that the hyperspheres run over the comparison range, do not overlap one another, and have maximum radii, and then selects the feature data detected at one of the positions in the real space closest to the position corresponding to the center of one of the hyperspheres as the enrollment data with top priority; and a memory that stores the enrollment data with a variable specifying the position in the real space detected by the sensor, and the posture of the part of the living body.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory view of acquiring a vein pattern with a noncontact biometric identification device in a palm vein identifying method;

FIG. 3B illustrates three degrees of freedom indicating the posture of a palm;

FIG. 5 illustrates the position $P_{i-1}$ at which the image of a palm is captured and the position $P^*_i$ at which the image of a palm registered as enrollment data is captured;

FIG. 9 illustrates the plots of the distance on the locus of the position $P_i$ at which the image of a palm is captured and the distance from the position $P_i$ to the closest boundary of the range;

FIG. 11 is another view of the method of selecting the position $P^*_i$ at which an image of the palm is registered as enrollment data;

FIG. 14 is another view of the method of selecting the position $P^*_i$ at which an image of the palm is registered as enrollment data;

DESCRIPTION OF EMBODIMENTS

Figure 2A:
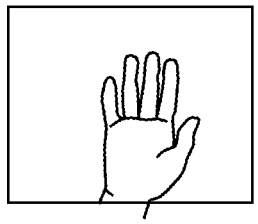
FIG. 2A is an example of an image of a palm acquired by a noncontact biometric identification device in a palm vein identifying method.
Figure 2B:
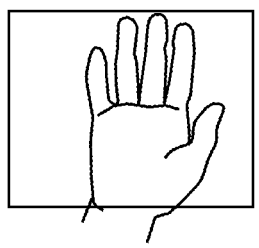
FIG. 2B is another example of an image of a palm acquired by a noncontact biometric identification device in a palm vein identifying method.
Figure 2C:
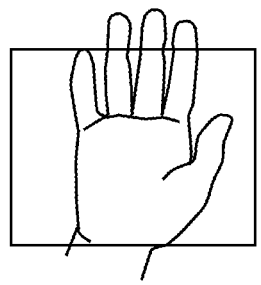
FIG. 2C is a further example of an image of a palm acquired by a noncontact biometric identification device in a palm vein identifying method.
Figure 2D:
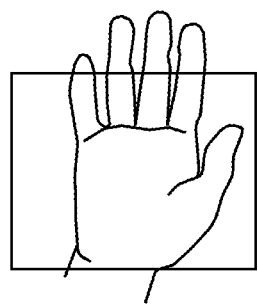
FIG. 2D is a further example of an image of a palm acquired by a noncontact biometric identification device in a palm vein identifying method.

An embodiment of the noncontact biometric identification device is described with reference to the attached drawings. The noncontact biometric identification device authenticates a user by his or her biometric features, such as the fingerprints, face, iris, voiceprints, handwriting, etc., and more specifically a noncontact biometric identification device authenticates a user without any touching occurring between the human body and the device.

The noncontact biometric identification device authenticates a user using the biometric features accompanying a part of a living body, that is, a fingerprint pattern, the shape of a face, a vein pattern, etc., accompanying the fingerprints, a face, veins, etc., without any touching occurring between a human body and the device.

Described below is a biometric identification device 100 in a palm vein identifying method as a noncontact identifying method. With a vein pattern used in the palm vein identifying method, the markings which appear as nets of veins are processed as a pattern, and the pattern included in the enrollment data which is registered in advance is compared with the pattern which is read upon identification, thereby authenticating the user. The pattern of blood vessels including veins is generally assumed to be unique throughout the world. It is also assumed that the topology of the pattern of blood vessels does not change over time, other than in scale, after it is generated in the womb unless it is changed by a serious injury. Furthermore, since the input data is inside a body, it is not subject to an attack (being stolen from a glance, deformation, etc.) from outside the body. Thus, the palm vein pattern changes very little and provides stable information, and can be used as impregnable and reliable information.

Reduced hemoglobin passes through veins, and oxyhemoglobin passes through arteries. Each type of hemoglobin has a different optical absorption coefficient. For example, when a palm is irradiated with near infrared light, the light is reflected less by the portion including veins, and the portion looks dark in the image. The pattern of the dark portion is used in the palm vein identifying method. The palm vein pattern (comparison pattern) acquired for user authentication is compared with the pattern of enrollment data (enrollment pattern) to judge whether or not they belong to the same person. The noncontact biometric identification device 100 uses the pattern matching system in comparison between the comparison pattern and the enrollment pattern. In the pattern matching system, the entire palm vein pattern is used in comparison. However, as in the minutia system, the position, the type, and the direction of a portion of the pattern of the feature of the palm vein may be compared. In addition, the pattern matching system and the minutia system may be used in combination.

As an identifying method using a vein pattern, a method using the veins of the back of a hand, a method of using the veins of a finger, etc. is well known, and the noncontact biometric identification device 100 described below may also be used for biometric identification in these methods.

The term "real space" refers to an actual space, or a practical 3-dimensional space.

The noncontact biometric identification device 100 uses the vein pattern acquired, at the center coordinates $C_i=(x_i, y_i, z_i, \theta x_i, \theta y_i, \theta z_i)$ of each sphere obtained when arranging on the palm locus in the feature space a plurality of spheres which do not run over the sensor detectable range and which have the maximum radius while not overlapping one another, from plural pieces of candidate data for registration, acquired by a motion similar to the motion of the palm for user authentication, as a packet of enrollment data (enrollment pattern). The "real space" in this case refers to a space defined by six variables for regulation of the position and the posture of a palm as described below, and is a dimensionless space obtained by projecting the sensor detectable range to each of six axes and scaling the values of the range to within −1 to +1. Thus, substantially the same motion is obtained between the registration of enrollment data (enrollment pattern) and the comparison for user authentication, and the enrollment data is prepared with variations in a sensor detectable range, thereby improving the usability while maintaining the identification accuracy.

In the descriptions below, the "image" of a palm may refer to the pattern and the data of the pattern relating to the biometric features (for example, veins).

FIG. 1 is an explanatory view of acquiring a vein pattern as enrollment data (enrollment pattern) with a noncontact biometric identification device in a palm vein identifying method.

As illustrated in FIG. 1, the noncontact biometric identification device (hereafter referred to simply as a biometric identification device) 100 includes a control unit 120, a distance sensor 102, a vein sensor 104, and a display device 118. The display device 118 prompts the user of the device 100 to move his or her palm H toward the vein sensor 104 in the area X in FIG. 1. The display is performed on the screen using sound and light. The biometric identification device 100 shoots an image of the palm used for user authentication or enrollment data by moving the palm H of a person to be authenticated from the position away from the vein sensor 104 to the position near the vein sensor 104 as illustrated in FIG. 1. When the palm H is arranged in the area X set in the real space, the distance sensor 102 detects the position and the posture of the palm H, and simultaneously the vein sensor 104 detects the vein pattern of the palm H. Thus, to perform user authentication using the device 100, the enrollment data is acquired by substantially the same operation as in the comparison.

FIGS. 1A through 2D are examples of the images of the palm captured while moving the palm H from the position away from the vein sensor 104 to the position near the vein sensor 104. FIGS. 2A through 2D illustrate four images obtained by the vein sensor 104 at four different time points included in the time period when the palm H exists in the area X.

Simultaneously, when the noncontact biometric identification device 100 illustrated in FIG. 1 obtains an image of the palm H existing in the area X using the vein sensor 104, it also obtains, using the distance sensor 102, the position and the posture of the palm.

When the hand is held in the air, the position and the posture of the hand have six degrees of freedom. That is, three degrees of freedom of the coordinates indicating the position (x', y', z') in the 3-dimensional space, and three degrees of freedom in the rotation angles (θx', θy', θz') indicating rotation in the three space axes X, Y, and Z.

Figure 3A:
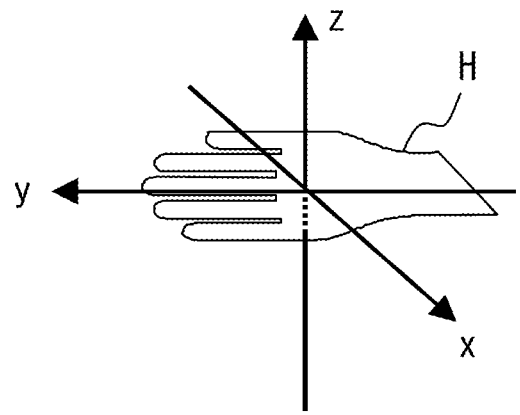
FIG. 3A illustrates three degrees of freedom indicating the position of a palm.

FIG. 3A illustrates the three degrees of freedom indicating the position (x', y', z') of the palm H. FIG. 3B illustrates the three degrees of freedom indicating the posture of the palm H.

Since the position and the posture of a hand have six degrees of freedom, the position and the posture of the hand may be expressed as the points in the feature space.

Figure 4:
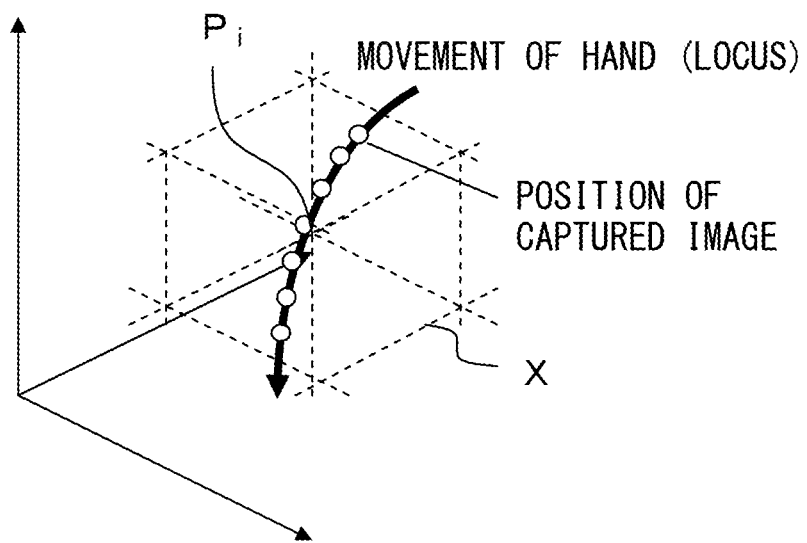
FIG. 4 illustrates the locus of a hand which passes the comparison range, and the position $P_i$ at which an image of the hand is captured.

FIG. 4 indicates the locus of the palm H in the 6-dimensional space when the palm H passes through the area X as illustrated in FIG. 1. However, since the six dimensions are not illustrated, a 3-dimensional space is illustrated in FIG. 4 for explanation.

Each axis of the 6-dimensional space has a comparison range Y identifiable depending on the distance sensor 102 and the vein sensor 104. The comparison range Y is a direct sum space of the area in the 3-dimensional space defined by the axes θx, θy, and θz indicating the rotations on the axes x, y, and z.

The vein pattern used as enrollment data is selected from among the vein patterns acquired at the point $P_i$ in the collation range Y in the 6-dimensional space. In the descriptions below, the vein pattern may be referred to simply as an "image". It is preferable that the point $P^*_i$ for acquisition of the vein pattern selected as enrollment data be arranged evenly in the comparison range Y. However, the identifiable range of each axis depends on the influence of a change in the axis direction on the distance sensor 102 and/or the vein sensor 104.

FIG. 5 illustrates the position $P_{i-1}$ at which a palm image is captured, and the position $P^*_i$ at which the palm image registered as enrollment data is captured. In this example, a 2-dimensional space is illustrated for explanation, but actually the position $P_{i-1}$ and the position $P^*_i$ are positions in the 6-dimensional space.

As illustrated in FIG. 5, the noncontact biometric identification device 100 obtains the locus of the palm H in the comparison range Y in the real space after normalizing the coordinates of the real space and each axis of the rotation angle around the axis of the real space within the identifiable range, and a plurality of spheres which do not run over the comparison range Y and have the maximum radius without overlapping one another are arranged on the locus for each piece of enrollment data. Then, with the point closest to the center of the spheres assigned the top priority, the obtained feature data about the biometric features of the palm H (vein pattern) is adopted as the enrollment data. However, when the image of the palm H obtained at the point closest to the center of the spheres is not clear or appropriate for enrollment data, the feature data obtained at the point second closest to the center of the spheres is adopted as enrollment data. The feature data may be related to features of a human body such as a vein pattern etc., or image data including biometric features. The number of pieces of enrollment data in FIG. 5 is 3.

<Configuration of Biometric Identification Device>

The configuration of the noncontact biometric identification device 100 is described below with reference to FIGS. 6 and 7.

Figure 6:
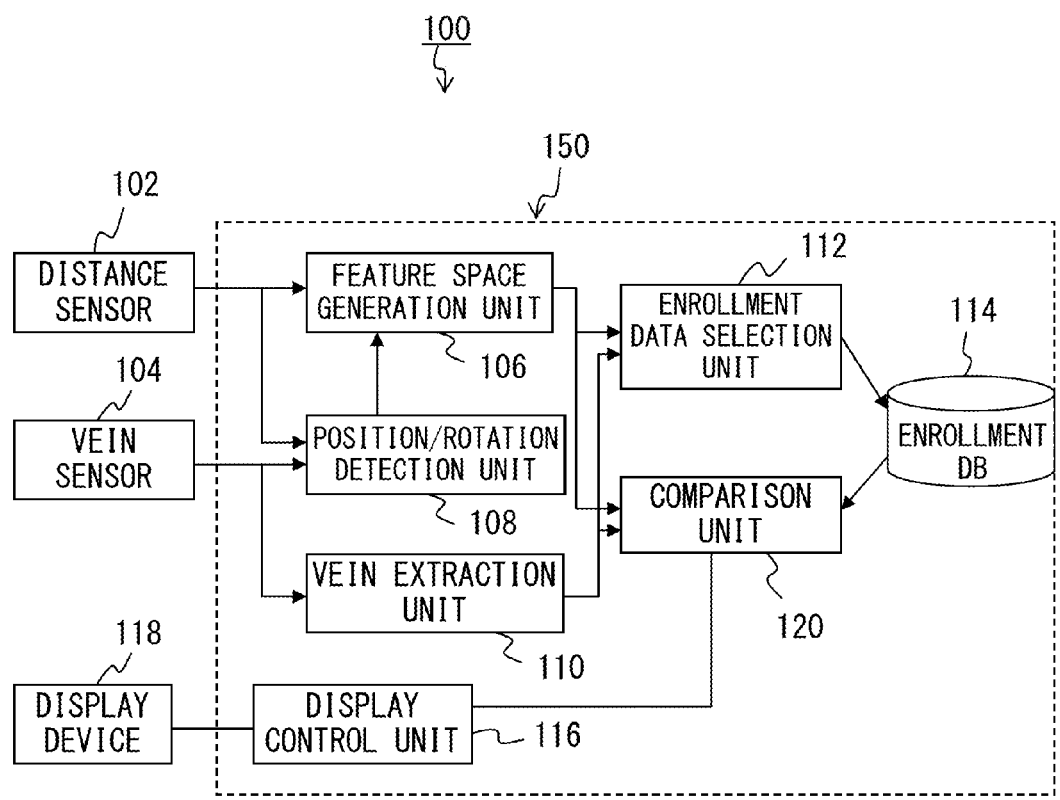
FIG. 6 is a block diagram of the functions of the noncontact biometric identification device.

FIG. 6 is a block diagram of the function of the biometric identification device 100.

The biometric identification device 100 includes the distance sensor 102, the vein sensor 104, the display device 118, and a control unit 150. The control unit 150 includes a feature space generation unit 106, a position/rotation detection unit 108, a vein extraction unit 110, a enrollment data selection unit 112, a enrollment database (DB) 114, a display control unit 116, and a comparison unit 120.

In response to the instruction from the display control unit 116 of the control unit 120, the display device 118 displays a prompt for a user of the device 100 to move the palm H in the comparison range X toward the vein sensor 104. The display is performed using sound or light.

The display control unit 116 of the control unit 150 displays on the display device 118 a prompt to urge a user of the device 100 to move the palm H in the collation range X toward the vein sensor 104 to authenticate the user of the device 100, or to acquire enrollment data for use in user authentication so that the palm H may draw the locus as illustrated in FIG. 1, that is, so that the palm H may pass through the comparison range X.

The distance sensor 102 detects as position data the position $P_i=(x', y', z')$ (i=1~n, n is a positive integer) of the palm H which moves in the 3-dimensional space, including the inside of the comparison range X. The distance sensor 102 is configured by a plurality of sensors, and the tilt of the palm H is measured. Then, the detected position data is transmitted to the feature space generation unit 106 and the position/rotation detection unit 108.

The vein sensor 104 acquires a series of images of the palm H which moves in the 3-dimensional space including the inside of the comparison range X, and transmits the acquired images of the palm H to the vein extraction unit 110. In addition, the image acquired by the vein sensor 104 is also transmitted to the position/rotation detection unit 108.

The position/rotation detection unit 108 determines the position $P_i=(x', y', z')$ of the palm H and the rotation angle $(\theta x', \theta y', \theta z')$ from the position data transmitted from the distance sensor 102 and the image transmitted from the vein sensor 104. The position $P_i=(x', y', z')$ of the palm H and the rotation angle $(\theta x', \theta y', \theta z')$ are transmitted to the feature space generation unit 106.

The position/rotation detection unit 108 may acquire the X coordinate x' and the Y coordinate y' of the position of the palm and the rotation angle $\theta z$ around the Z axis from the shape of the palm in the image of the palm H transmitted from the vein sensor 104. In this case, the Z coordinate z' of the position of the palm and the rotation angles $\theta x'$ and $\theta y'$ around the X axis and the Y axis are acquired from the shape of the palm H from the distance sensor 102.

The position/rotation detection unit 108 generates a 6-dimensional feature space T indicating the position and the posture of the palm H.

In the feature space T, the value of each axis is normalized.

To be "normalized" is to scale a value for a dimensionless expression so that the value range obtained when the identifiable range of each axis, that is, the comparison range Y, is projected to each of the six axes can be the range from −1 to +1. For example, the range of the X axis and Y axis of the comparison range Y is from −50 mm to +50 mm, but the range is −30 mm to +30 m along the Z axis. That is, when the palm H is positioned in the area outside the range, it is hard for the biometric identification device 100 to authenticate the user. Thus, the value is converted so that the identifiable range of each axis can be from −1 to +1. For example, if the value of the x component of the position is +25 mm, the dimensionless expression is realized by 25 mm/50 mm=0.5. By performing the normalization, the position change of each axis may be processed equivalently. To be more strict, it is more preferable to normalize a value depending on the output feature of the vein sensor 104. For example, the change of the output of the distance sensor 102 is moderate for the angle change around 0°. However, when the change becomes larger with a larger angle, the influence of the value change of each axis is leveled by the normalization.

Furthermore, the feature space generation unit 106 calculates the coordinates $(x, y, z, \theta x, \theta y, \theta z)$ in the corresponding feature space T from the position $(x', y', z')$ and the rotation angle $(\theta x', \theta y', \theta z')$ of the palm H. The coordinates $(x, y, z, \theta x, \theta y, \theta z)$ in the feature space T are also called a feature space coordinate. The feature space coordinate $(x, y, z, \theta x, \theta y, \theta z)$ is transmitted to the enrollment data selection unit 112 with the image of the palm H acquired by the vein sensor 104 at the position $P_i$ corresponding to the feature coordinate.

The vein extraction unit 110 extracts a vein pattern from the image of the palm H acquired by the vein sensor 104, and transmits the pattern to the enrollment data selection unit 112. To extract a vein pattern, the palm is irradiated with near infrared light, and the dark portion in the image is extracted as a vein pattern. The reduced hemoglobin has a large near-infrared absorption coefficient. Since the vein part looks dark in the image, a vein pattern may be extracted.

The enrollment data selection unit 112 selects the position $P^*_i$ by a specified number of pieces of enrollment data from the position $P_i$ at which the vein sensor 104 and the distance sensor 102 have acquired the image of the palm H, and obtains as enrollment data the vein pattern based on the image captured at the position $P^*_i$.

As explained above with reference to FIG. 5, the enrollment data is a vein pattern corresponding to the image acquired by the center coordinate $C_i=(x_i, y_i, z_i, \theta x_i, \theta y_i, \theta z_i)$ of each sphere arranged on the locus of the palm H in the feature space so that they do not run over the range and have the maximum radius without overlapping one another.

The enrollment data selection unit 112 arranges a specified number of spheres along the line corresponding to the locus in the real space within the comparison range Y set in advance in the feature space and including the area corresponding to the comparison range X so that the spheres do not run over the collation range Y, so that they do not overlap one another and have the maximum radius. Furthermore, the image (feature data) detected at the position of the real space closest to the position of the real space corresponding to the center of the spheres is selected as the enrollment data (enrollment pattern).

The enrollment database 114 stores the image selected by the enrollment data selection unit 112 or the vein pattern (enrollment pattern) obtained from the image with the coordinates of the feature space corresponding to the position at which the image is obtained. The enrollment database 114 is also called a enrollment data storage unit.

The enrollment data (enrollment pattern) is used in the comparing process performed by the user of the device 100 for user authentication.

In the comparing process, the sensors 102 and 104 acquire the image (vein collation pattern) obtained when the user of the device 100 moves the palm H within the comparison range X for user authentication, acquire the position at which the image is acquired, and acquire the posture of the palm H in the position. The position at which the image is acquired by the feature space generation unit 106 and the posture of the palm H in the position are converted into the points in the feature space T. Then, the comparison unit 120 selects with top priority the sphere which has the center closest to the point. When the vein pattern obtained in the 3-dimensional real space corresponding to the center point of the hypersphere which has the center in the closest position is not appropriate for biometric identification, the next closest sphere may be selected. Then, the enrollment data (vein enrollment pattern) relating to the hypersphere is compared with the vein comparison pattern, and it is determined whether or not they match each other. If the determination result is in the affirmative, it is judged that the enrollment pattern and the comparison pattern indicate the vein pattern of the same person. The comparison pattern may be compared with a plurality of enrollment patterns.

The comparison unit 120 compares the image obtained for comparison with the enrollment data relating to the center of the hypersphere that is closest to the position in the feature space that is determined by the position in the real space at which the image is obtained for the comparison and the posture of the palm H at the position.

In addition, the comparison unit 120 calculates the passage rate defined by the rate at which the locus drawn when the palm H moves within the comparison range for user authentication is included in the hypersphere, and determines that a prompt is to be issued to move the palm H again within the comparison range X for user authentication when the passage rate is lower than a specified threshold, for example, 30%. The information about the determination is transmitted to the display control unit 116. Upon receipt of the information, the display control unit 116 outputs to the display device 118 an instruction to display the information, and the display device 118 displays the prompt to urge the user of the device 100 to move the palm H again within the comparison range X for user authentication.

The threshold is not limited to 30%, and may be 10%, 25%, 40%. 45%, etc.

The biometric identification device 100 with the above-mentioned configuration may systematically obtain enrollment data with variations. Furthermore, the enrollment data for improvement of the usability may be acquired while maintaining the identification accuracy of the biometric identification device 100.

In addition, when enrollment data is acquired, the biometric identification device 100 performs an operation similar to that performed for user authentication. Therefore, the similarity between the enrollment data and the code may be enhanced, and the best result of user acceptance is obtained. Furthermore, since the image obtained when the palm which is to be used for user authentication passes within the specified range is used for both the enrollment data and the collation data, an improper posture may be rejected, and the possibility that an unauthentic user may be accepted is reduced.

Each function block of the device illustrated in FIG. 6 may be configured using a computer with a standard hardware configuration.

Figure 7:
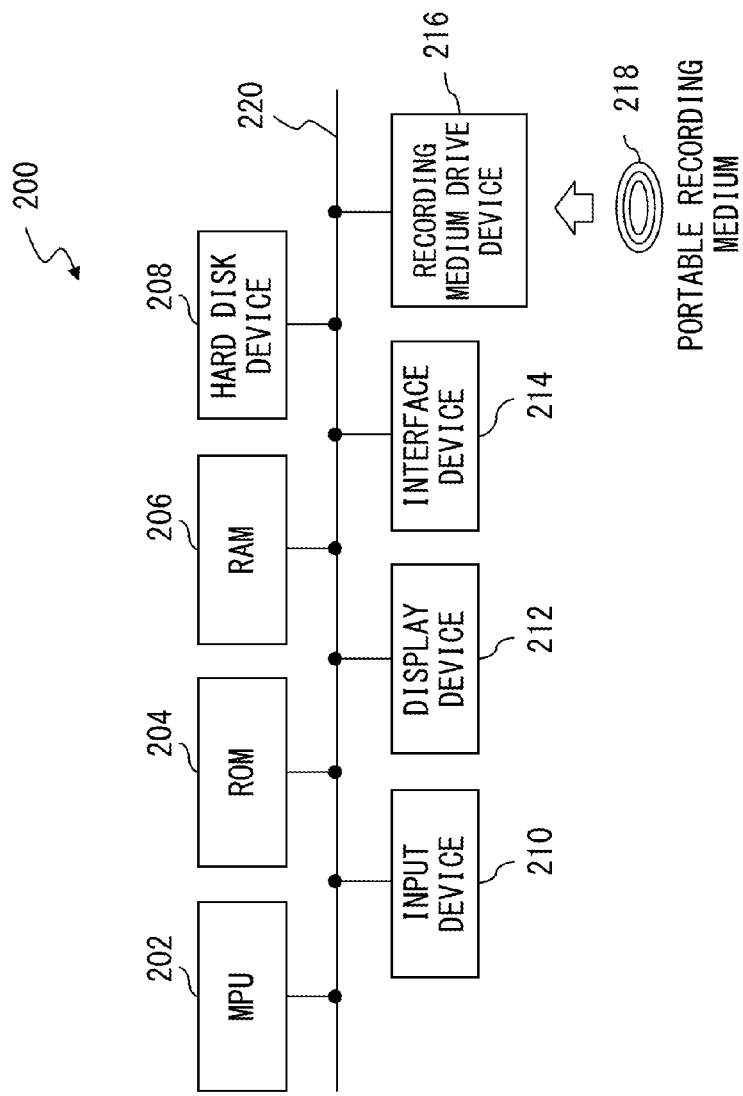
FIG. 7 is a configuration of the noncontact biometric identification device.

The configuration illustrated in FIG. 7 is described below. FIG. 7 is a configuration of an example of a computer available for the control unit 120 of the noncontact biometric identification device 100 illustrated in FIG. 6.

A computer 200 includes an MPU 202, ROM 204, RAM 206, a hard disk device 208, an input device 210, a display device 212, an interface device 214, and a recording medium drive device 216. These components are connected through a bus line 220, and may communicate various types of data with one another under the management of the MPU 202.

The MPU (microprocessing unit) 202 is a processor for controlling the entire operation of the computer 200, and functions as a controlling unit of the computer 200.

The ROM (read only memory) 204 is read-only semiconductor memory in which a specified basic control program is stored in advance. The MPU 202 reads the basic control program when the computer 200 is activated, and executes the program, thereby controlling the operation of each component of the computer 200.

The RAM (random access memory) 206 is semiconductor memory which may be written and read at any time for use as a work storage area as necessary when the MPU 202 executes various types of control programs.

The hard disk device 208 is a storage device which stores various types of control programs to be executed by the MPU 202 and stores various types of data. The MPU 202 reads and executes a specified control program stored in the hard disk device 208, thereby performing various types of controlling processes described later.

The input device 210 is, for example, a mouse device and a keyboard device. When operated by a user of the system illustrated in FIG. 6, the device acquires the input of various types of information associated with the operation contents, and transmits the acquired input information to the MPU 202.

The display device 212 is, for example, a liquid crystal display, and displays various types of text and images depending on the display data transmitted from the MPU 202.

The interface device 214 manages the communication of various types of information between various types of equipment connected to the computer 200. To be more concrete, the interface device 214 manages the communication of various types of data such as the image of a palm H, data relating to the position and posture of the palm H, etc., which is performed between the distance sensor 102 and the vein sensor 104 in FIG. 6 through a communication network.

The recording medium drive device 216 reads various control programs and data stored in a portable recording medium 218. The MPU 201 reads through the recording medium drive device 216 and executes a specified control program stored in the portable recording medium 218, thereby performing various controlling processes described later. The portable recording medium 218 may be, for example, flash memory provided with a connector having a USB (universal serial bus) standard, CD-ROM (compact disc read only memory), DVD-ROM (digital versatile disc read only memory), etc.

To configure the control unit 120 of the noncontact biometric identification device 100 in FIG. 6 using the above-mentioned computer 200, for example, a control program for allowing the MPU 202 to perform the above-mentioned various controlling processes is to be generated. The generated control program is stored in advance in the hard disk device 208 or the portable recording medium 218. Then, a specified instruction is issued to the MPU 202 to read and execute the control program. Thus, the function of the comparison unit 120 of the noncontact biometric identification device 100 is provided by the MPU 202. Therefore, the computer 200 functions as the comparison unit 120 of the noncontact biometric identification device 100.

<Enrollment Data Selecting Process>

The enrollment data selecting process, which is the process of selecting enrollment data (enrollment pattern), performed by the noncontact biometric identification device 100 is described below with reference to FIGS. 8 through 15.

As described above, each time a hand is held above the noncontact biometric identification device for user authentication, the position and the direction of the hand may greatly fluctuate, and the background may be taken because the hand does not completely cover the capturing area, thereby acquiring various images. Accordingly, the enrollment data will vary widely when used in comparison with the various images for user authentication. Described below is the method for systematically selecting the enrollment data used for user authentication on the noncontact biometric identification device 100. The enrollment data selecting process described below is mainly performed by the enrollment data selection unit 112.

Figure 8:
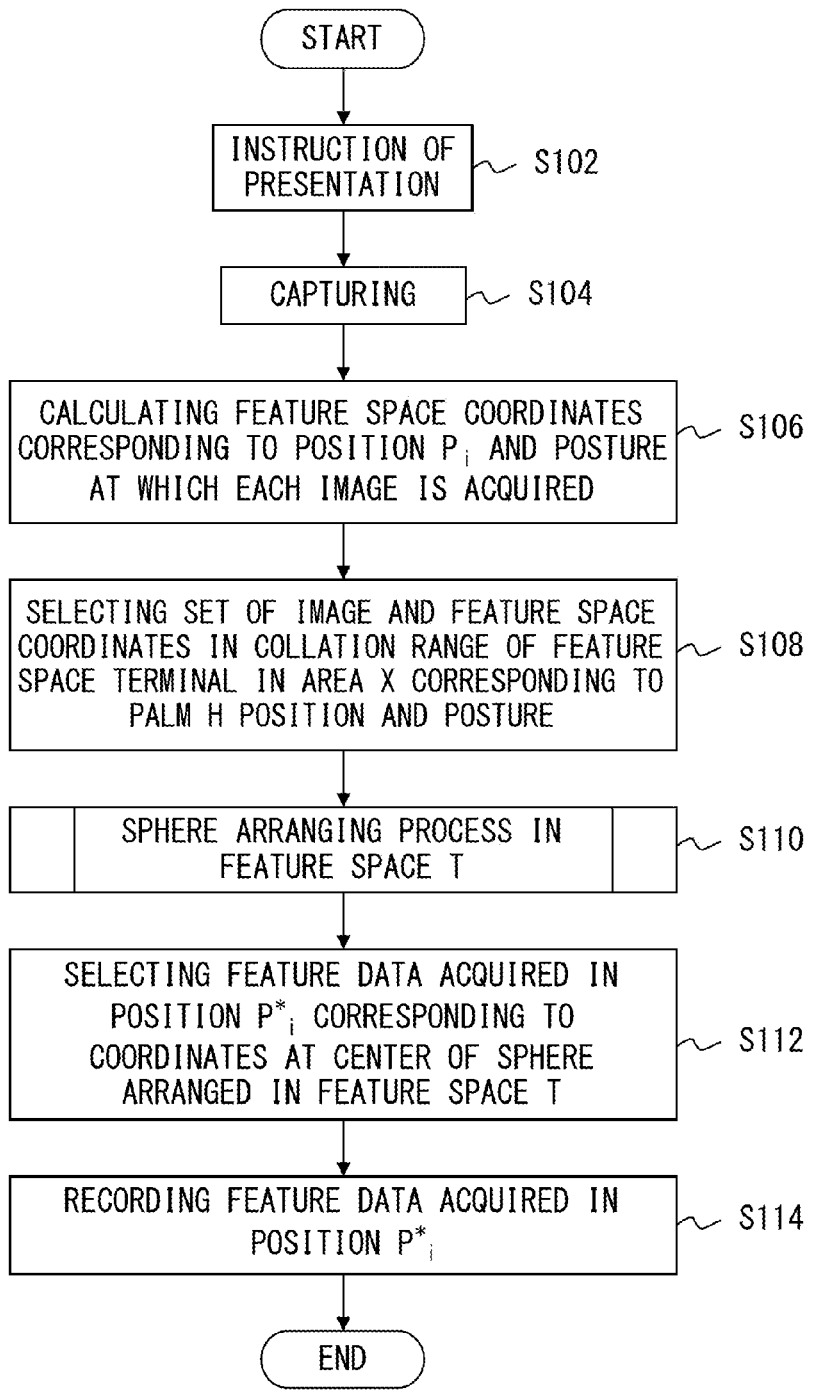
FIG. 8 is a flowchart of the process performed by the noncontact biometric identification device.

FIG. 8 is a flowchart of the process by the noncontact biometric identification device 100.

In S102, the display device not illustrated in FIG. 6 issues an instruction to the user of the device 100 to hold his or her hand above the collation range X illustrated in FIG. 1.

Next, in S104, the palm H which is moving within the comparison range X is captured in a plurality of positions $P_i$ (i=1~n, n is a positive integer) to acquire a series of palm images. The palm images are used for obtaining the posture of the palm H. Simultaneously, the distance sensor measures, as necessary, a series of positions $(x_i', y_i', z_i')$ of the palm H in the 3-dimensional space and the posture, that is, the rotation angle $(\theta x_i', \theta y_i', \theta z_i')$ indicating the rotations about three space axes (X axis, Y axis, Z axis). From the data obtained by a plurality of distance sensors, the posture of the hand may be determined.

Next in S106, after S104, from the position $P_i=(x_i', y_i', z_i')$ and the rotation angle $(\theta x_i', \theta y_i', \theta z_i')$ at which the image of the palm H is captured, corresponding feature space Coordinates $(x_i, y_i, z_i, \theta x_i, \theta y_i, \theta z_i)$ are calculated. The transform from the real space coordinates $(x_i', y_i', z_i')$ and the rotation angle $(\theta x_i', \theta y_i', \theta z_i')$ to the coordinates in the feature space T is the transform of the comparison range X of the position $P_i=(x_i', y_i', z_i')$, and the rotation angle $(\theta x_i', \theta y_i', \theta z_i')$ is transformed into the collation range Y defined by $-1 \leq x, y, z, \theta x, \theta y, \theta z \leq +1$ in the feature space T.

In S108, in the n feature space coordinates $(x_i, y_i, z_i, \theta x_i, \theta y_i, \theta z_i)$ calculated in S106, a set of the images of the palm H included in the collation range Y in the feature space T and the feature space coordinates $(x_j, y_j, z_j, \theta x_j, \theta y_j, \theta z_j)$ (j=1~m) is selected.

Next, in S110, the sphere arranging process is performed in the feature space T. The sphere arranging process is described later with reference to FIGS. 9 through 15.

In S112, the image acquired at the position $P^*_i$ corresponding to the coordinates of the center of the sphere arranged in the feature space T is selected as the enrollment data.

Next in S114, the enrollment data selected in S112 is stored in a database. The enrollment data stored in the database is referenced in the collation for user authentication.

When the process in S114 is completed, the enrollment data selecting process is terminated.

<Sphere Arranging Process>

Next, the sphere arranging process in the feature space T is described below with reference to FIGS. 9 through 15.

FIG. 9 is an example of the relationship between the distance (horizontal axis) of the position $P_i=(x_i', y_i', z_i')$ at which the image of the palm H is acquired from the boundary of the comparison range Y along the locus L and the distance d (vertical axis) from the point to the closest range boundary in the locus of the palm H.

The distance from the boundary of the comparison range Y along the locus L is the distance from the point $(x_0, y_0, z_0, \theta x_0, \theta y_0, \theta z_0)$ in the hyperspace corresponding to the point in the range X in which the palm H is detected by the sensor in the real space along the locus L.

In the sphere arranging process, a specified number (enrollment number) of spheres are arranged as having the maximum radius without run-over from the comparison range Y or overlapping one another. To judge whether or not the first condition of no run-over from the comparison range Y is satisfied, the minimum value of the distance from the center of the sphere to the boundary of the comparison range Y is considered.

What is called the "sphere" in this specification is a so-called hypersphere in the 6-dimensional feature space T. That is, in the feature space coordinates T, it is a group of points (x, y, z, $\theta x, \theta y, \theta z$) having a constant distance from $(x_c, y_c, z_c, \theta x_c, \theta y_c, \theta z_c)$ in the feature space coordinates T and satisfying the following equation.

$$D = \sqrt{(x-x_c)^2+(y-y_c)^2(z-z_c)^2+(\theta x-\theta x_c)^2+(\theta y-\theta y_c)^2+(\theta z-\theta z_c)^2} = \text{const.}$$

In FIG. 9, in the six axes in the 6-dimensional feature space T, five axes remain at 0, and only one axis is changed. For example, in this case, the palm H remain unchanged in the X axis, Y axis, and rotation angle, and the hand moves straight in the Z-axis direction and passes through the center of the comparison range Y. When the hand enters the comparison range Y, the distance d is 0, and the distance from the boundary increases with the passage toward the inside of the comparison range Y. At the center of the collation range Y, the distance to each of the six boundaries of the comparison range Y is 1.0. In this case, the distance to the boundary indicates the maximum value, that is, the maximum value $d_{max}=1.0$. When the palm H passes over the center of the comparison range Y, it approaches the opposite boundary, the distance decreases, and the distance reaches 0 again when the hand exits the range.

In FIG. 9, the palm H moves along the Z axis as one of the center axes in the collation range Y as a 6-dimensional hypercube. In the real space, the hand moves straight in the height direction (z' axis direction) without a shift in the horizontal direction (x' direction, y' direction), tilt, or rotation ($\theta$x' axis, $\theta$y' axis, $\theta$z' axis directions). In this case, for the distance from one of the boundaries along the locus L, the minimum value of the distance to the boundary of the comparison range Y changes linearly in the graph. However, generally, for the distance from one of the boundaries along the locus L, the minimum value of the distance to the boundary of the comparison range Y changes nonlinearly in the graph.

Figure 10:
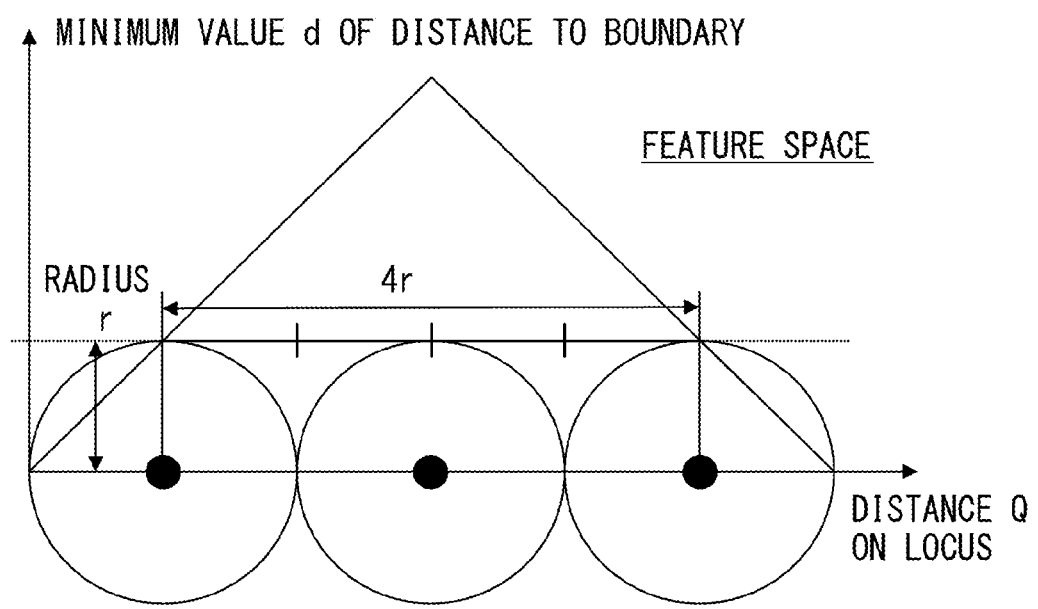
FIG. 10 is an explanatory view of the method of selecting the position $P^*_i$ at which an image of the palm is registered as enrollment data.

In a case three pieces of enrollment data would be selected as illustrated in FIG. 10, a radius R of a hypershpere is selected such that the radius R of the hypershpere is equal to a quarter of a line segment, where let a straight line be defined so as to have a constant value r as the minimum distance d to the boundary of the comparison range Y, and the line segment is obtained in the manner in which a curve having the minimum value di is cut by the straight line to have a simply-connected segment. Then, the three points having the distances of r, 3r, and 5r along the locus L from the crossing over point of the locus L of the palm H and the comparison range X are selected as the center of the sphere. The data of the image captured at the position $P^*_i=(x_i', y_i', z_i')$ in the real space corresponding to the three points in the feature space T is selected as enrollment data.

As is clearly illustrated in FIG. 10, the radius is obtained by equally dividing the line crossing the plotted triangle into four parts, and the points of the line crossing the radius having equal height (minimum value of distance) are to be selected. However, since in practice horizontal shifts, tilts, etc., occur, as illustrated in FIG. 11, the plots are lower (shorter distance to the boundary) than those in FIG. 10. If the three pieces of enrollment data are simply and equally arranged on the locus, the spheres on both sides run over the registered range.

Figure 12:
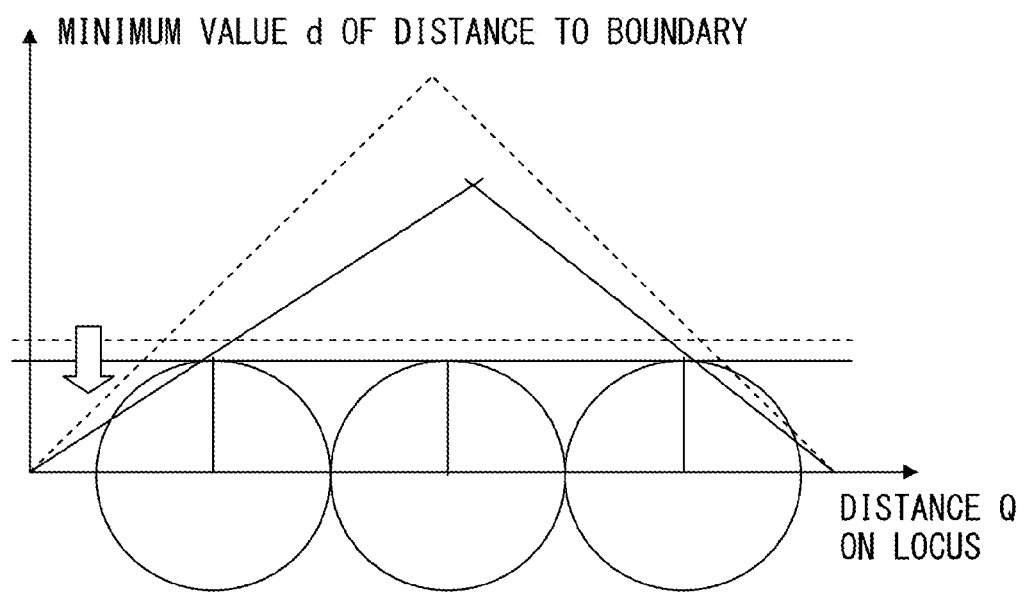
FIG. 12 is another view of the method of selecting the position $P^*_i$ at which an image of the palm is registered as enrollment data.

Thus, if the spheres on both sides run over the registered range by simply and equally arranging the three pieces of enrollment data on the locus L, the radius of the hypersphere is reduced and rearranged as illustrated in FIG. 12.

In FIG. 12, the hypersphere is reduced in radius so that it becomes detached from the boundary of the comparison range Y. That is, a specified number of spheres are arranged so that they have the maximum radius with the center point arranged on the locus without touching the boundary of the comparison range Y and without overlapping one another.

Figure 13:
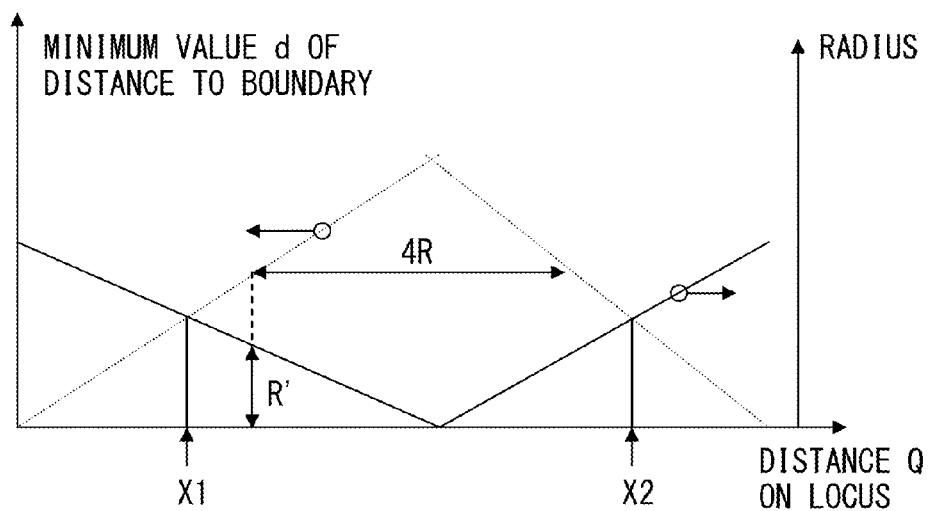
FIG. 13 is another view of the method of selecting the position $P^*_i$ at which an image of the palm is registered as enrollment data.

In FIG. 13, the broken line indicates the distance Q on the locus L and the distance $d_i$ from the point Q to the closest range boundary. Let m be the number of arranged spheres, the solid line indicates the value of 1/(2m−2) of the length (2m−2)R of a line segment, that is R, when let a straight line be defined to have a constant value r as the minimum distance $d_i$ to the boundary of the comparison range Y, and the line segment is obtained in the manner in which the straight line is cut by a curve having the minimum value $d_i$ so as to be simply-connected. The value r=R is obtained at two points X1 and X2 where two lines cross each other, thereby exceeding the radius of the hypersphere.

FIG. 14 is an example of three hyperspheres arranged as described above.

The hyperspheres have their centers at X1, X2, and the central point between X1 and X2. The three hyperspheres are arranged as tangents to each other. No hypersphere runs over the comparison range Y.

FIGS. 12 through 14 illustrate the method of arranging the hyperspheres when the palm H draws the locus in the area X in FIG. 1 in the Z-axis direction. However, generally, the palm H does not linearly move in the area X. In this case, as illustrated in FIG. 9, the minimum value d of the distance to the boundary for the distance Q on the locus refers to a curve, not a straight line. Even in this case, the arrangement of the hypersphere may be determined in a procedure similar to the above-mentioned procedure.

Figure 15:
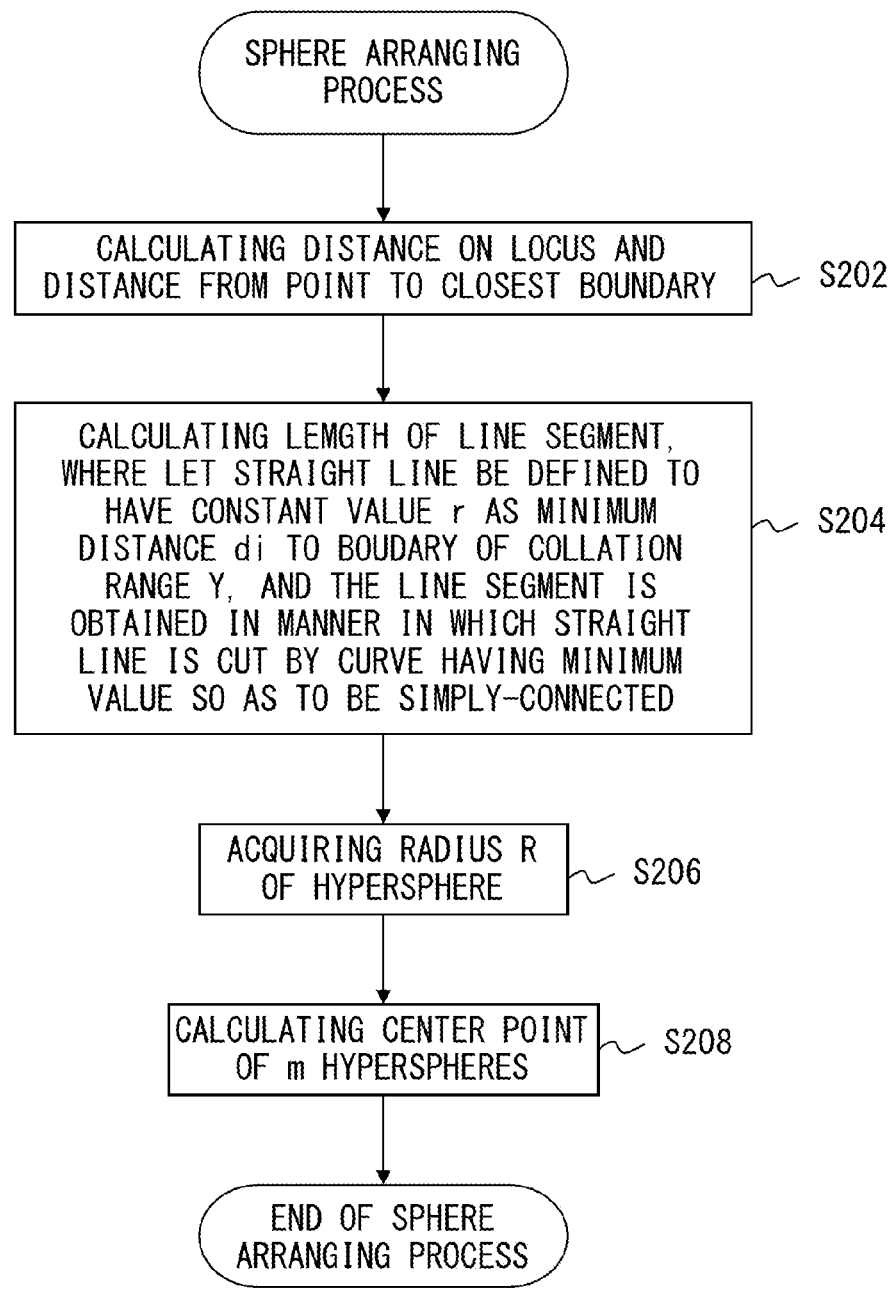
FIG. 15 is a flowchart of the sphere arranging process.

FIG. 15 is a flowchart of the sphere arranging process.

In S202, the distance from the boundary of the comparison range Y on the locus L of the palm at the position $P_i=(x_i', y_i', z_i')$ where the image of the palm H is acquired, and the minimum value d of the distance from the position $P_i=(x_i', y_i', z_i')$ to the boundary of the comparison range Y are calculated.

Next in S204, using the relationship between the distance from the boundary of the comparison range Y acquired in S202 and the minimum value $d_i$ of the distance from the position $P_i=(x_i', y_i', z_i')$ to the boundary of the comparison range Y, the length of a line segment is obtained, where let a straight line be defined to have a constant value r as the minimum distance $d_i$ from the line to the boundary of the comparison range Y, and the line segment is obtained in the manner in which the straight line is cut by a curve having the minimum value $d_i$ so as to be simply-connected.

Next in S206, the radius R of the hypersphere is obtained to acquire the arrangement of the sphere so that the length of the line obtained is (2m−2) r, with m as the specified number (registered number) of spheres to be arranged, and r as the minimum value d.

In S206, the radius R of the hypersphere is obtained. In FIG. 13, the broken line indicates the distance Q on the locus L and the distance $d_i$ from the point Q to the closest range boundary. Let m be the number (registered number) of hyperspheres to be arranged, the solid line indicates the value of 1/(2m−2) of the length (2m−2)R of the line, that is R, where let a straight line be defined to have a constant value r as the minimum distance $d_i$ from the line to the boundary of the collation range Y, and the line segment is obtained in the manner in which the straight line is cut by a curve having the minimum value $d_i$ so as to be simply-connected. At the two points where the two lines cross each other, the value r equals R (r=R), thereby exceeding the radius of the hypersphere.

That is, in S206, the radius of the hypersphere is acquired from the relationship (broken line) between the position Q at which the vein pattern of the palm H is acquired and the minimum value d of the distance from the position Q to the boundary of the closest collation range Y, and the relationship (solid line) between the position Q at which the image of the palm H is acquired, and the value of 1/(2m−2) of the length (2m−2)R of the line, that is R, where let a straight line be defined to have a constant value r as the minimum distance $d_i$ to the boundary of the collation range Y, and the line segment is obtained in the manner in which the straight line is cut by a curve having the minimum value $d_i$ so as to be simply-connected, where m is the number of hyperspheres to be arranged.

Next in S208, the center points (coordinates in the feature space T) of m hyperspheres are obtained.

The two points obtained in S204 provide two center points of end hyperspheres in the arrangement. Then, (m−2) hyperspheres are arranged at equal intervals between the two end hyperspheres, and the center points of (m−2) spheres are obtained. The points $P_j^*=(x_j', y_j', z_j')$ (j=1~m) corresponding to the m coordinates in the feature space T, the m coordinates being consisted of the two center points of the end spheres and the (m−2) center points of the middle spheres, correspond to the positions $P_j^*$ at which the vein pattern registered as enrollment data are captured.

In S208, m hyperspheres are arranged along the locus without run-over from the collation range Y and without overlapping one another, and the center points of m hyperspheres are calculated.

When the process in S208 is completed, control is returned to S112 in FIG. 8.

Thus, in S202 through S208, a specified number (registered number) of spheres having the maximum radius are arranged without run-over from the collation range Y and without overlapping.

<Comparison Process>

Figure 16:
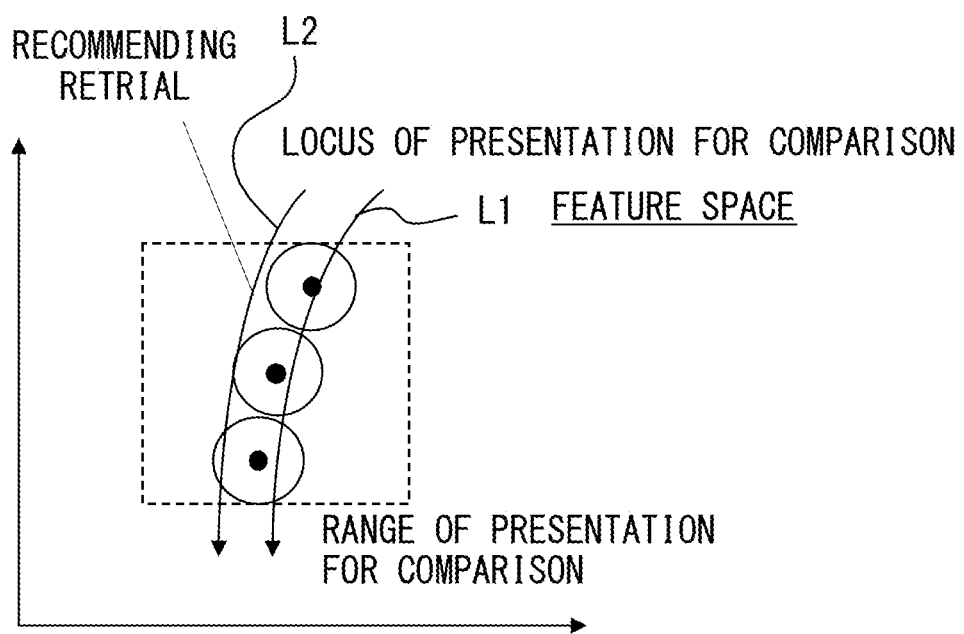
FIG. 16 is an explanatory view of the case in which the retrial recommending process is performed in the comparing process.
Figure 17:
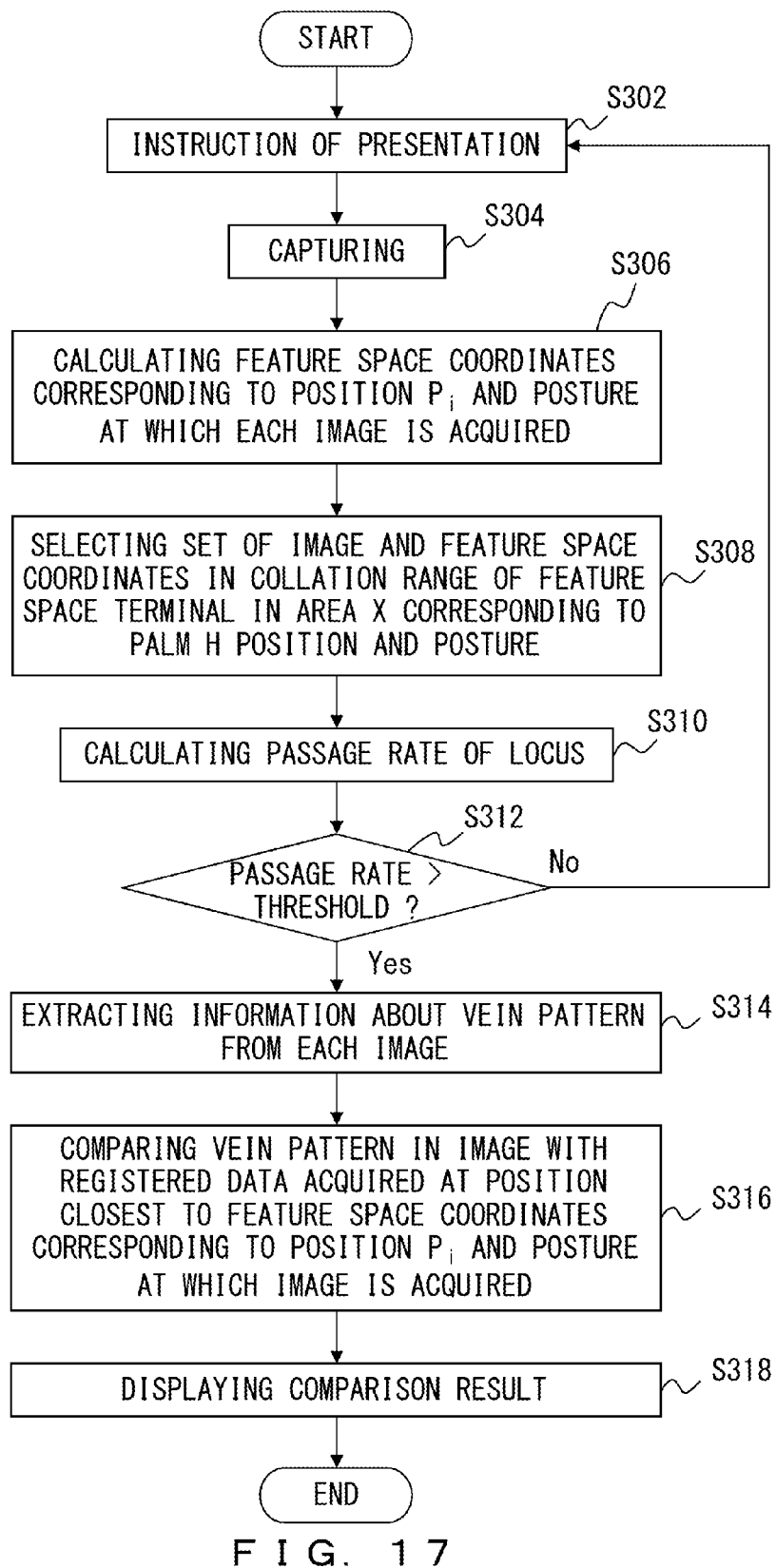
FIG. 17 is a flowchart of the retrial recommending process.

With reference to FIGS. 16 and 17, the comparison process for user authentication performed by the noncontact biometric identification device 100 is described below. FIG. 16 is a flowchart of the retrial recommending process. FIG. 17 is an explanatory view of the case in which the retrial recommending process is performed in the comparing process.

The processes in S302 through S308 in FIG. 16 are similar to the processes in S102 through S108. In this case, the user of the device 100 moves the palm H for comparison.

That is, in S302, an instruction is issued to the user of the device 100 on the display device not illustrated in FIG. 6 to move the palm H to the comparison range X in FIG. 1.

Next in S304, the palm H which moves while drawing the locus L is captured in a plurality of positions $P_i$(i=1~n, n is a positive integer), and a series of images of the palm H are acquired. From the images, a vein collation pattern is generated, and compared with a enrollment pattern registered in advance. The loci L1 and L2 in FIG. 17 are examples of the locus L. The palm images may be used in acquiring the posture of the palm H. Simultaneously, the distance sensor measures, as necessary, a series of positions $(x_i', y_i', z_i')$ in the 3-dimensional space of the palm H and the posture, that is, the rotation angle $(\theta x_i', \theta y_i', \theta z_i')$ indicating the rotation around the three space axes (X axis, Y axis, Z axis). From the data measured by a plurality of distance sensors, the posture of the hand may be determined.

Next, in S306, which is after S304, the corresponding feature space coordinates $(x_i, y_i, z_i, \theta x_i, \theta y_i, \theta z_i)$ are calculated from the position $P_i=(x_i', y_i', z_i')$ at which the image of the palm H is captured and the rotation angle $(\theta x_i', \theta y_i', \theta z_i')$. The transform from the real space coordinates $(x_i', y_i', z_i')$ and the rotation angle $(\theta x_i', \theta y_i', \theta z_i')$ to the coordinates in the feature space T is the transform of the comparison range X of the position $P_i=(x_i', y_i', z_i')$, and the rotation angle $(\theta x_i', \theta y_i',$ $\theta z_i'$) is transformed into the comparison range Y defined by $-1 \leq x, y, z, \theta x, \theta y, \theta z \leq +1$ in the feature space T.

In S308, in the n feature space coordinates ($x_i, y_i, z_i, \theta x_i, \theta y_i, \theta z_i$) calculated in S106, a set of the images of the palm H included in the comparison range Y in the feature space T and the feature space coordinates ($x_j, y_j, z_j, \theta x_j, \theta y_j, \theta z_j$) (j=1~m) is selected.

In S310, which is after S308, a passage rate defined by the rate at which the locus L passes through the inside of a plurality of hyperspheres used in the registration of enrollment data is calculated. The passage rate is an index indicating whether or not the operation in registration is the same as the operation in comparison.

In S312, it is determined whether or not the passage rate is higher than the threshold. If the result of the determination in S312 is NO, that is, the passage rate is not higher than the threshold, control is returned to S302. If the result of the determination in S312 is YES, that is, if the passage rate is higher than the threshold, control is passed to S314.

In S314, the information about the vein pattern is extracted from each image acquired in S304.

In S316, the vein pattern extracted in S314 is compared with the enrollment data using the pattern matching method, wherein the enrollment data is the feature data that is obtained at the position $P_i$ where the image is acquired and a position in the real space corresponding to the position in the future space at which the posture is indicated.

In S318, the result of the comparison in S316 displayed.

Since the operation of a user is roughly predicted (has an inclination), it is sufficient to cover the range within which the user normally moves, and covering other areas is not only wasteful, but also can cause a false acceptance error. Therefore, when the passage rate is very low, there is the possibility of an unauthentic user. However, when registration is performed in an unfamiliar state in the operation, a movement may be changed as the user becomes used to the operation. If the passage rate is continuously lower than a specified value, the re-registering process may be recommended on the display device.

The feature space may be appropriately degenerated depending on the capacity of the comparison algorithm.

For example, when the XY plane is isotropic, the 6-dimensional space in which the coordinates are expressed by (x, y, z, $\theta x, \theta y, \theta z$) may be degenerated to the 5-dimensional space in which the coordinates are expressed by (r, z, $\theta x, \theta y, \theta z$) using the variable r defined by $r=(x'^2+y'^2)^{1/2}$. In addition, when the rotation on the XY plane may be ignored, the 6-dimensional space in which the coordinates are expressed by (x, y, z, $\theta x, \theta y, \theta z$) may be degenerated to the 5-dimensional space in which the coordinates are expressed by (x, y, z, $\theta x, \theta y$). In any case, the computational complexity may be reduced by reducing the dimensions of the feature space T.

Furthermore, the usability may be improved while maintaining the identification accuracy by obtaining as enrollment data the images relating to the centers of a plurality of hyperspheres arranged as having the maximum radius along the line corresponding to the locus in the real space without runover from the comparison range or without overlapping one another.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A noncontact biometric identification device, comprising:
    a sensor that detects feature data including a feature of a part of a living body at a plurality of positions in a range defined in advance in a real space when the part of the living body moves in the range to acquire enrollment data, wherein the feature data is linked to position data relating to the plurality of the positions in the range and to posture data about a posture of the part of the living body at the plurality of positions while detection;
    a processor that arranges a specified number of hyperspheres in a comparison range defined in advance in a feature space along a line defined by a locus of the living body in the real space, wherein the feature space is spanned by a coordinate specifying a position of the part of the living body in the real space and a variable specifying the posture of the part of the living body, and the comparison range includes a space corresponding to the range in the real space and a space corresponding to a space covered by the posture detected by the sensor, such that the hyperspheres run over the comparison range, do not overlap one another, and have maximum radii, and then selects the feature data detected at one of the positions in the real space closest to the position corresponding to the center of one of the hyperspheres as the enrollment data with top priority; and
    a memory that stores the enrollment data with a variable specifying the position in the real space detected by the sensor, and the posture of the part of the living body.

2. The device according to claim 1,
wherein the sensor detects the feature data including a feature of the part of the living body when a part of the living body moves in the comparison range for user authentication, the feature data being linked to the position in the comparison range and the posture data indicating a posture of the part of the living body at the plurality of positions, and
the processor further compares the feature data with the enrollment data relating to a center of the hypersphere that is closest to the position in the feature space corresponding to the position and the posture at top priority.

3. The device according to claim 2, wherein
the processor calculates a passage rate that is defined by a rate at which a locus drawn for user authentication by a movement of the part of the living body in the comparison range is included inside the hypersphere, and determines that the part of the living body is to be moved again within the collation range for user authentication when the passage rate is lower than a specified value.

4. The device according to claim 1, wherein
the part of the living body is a hand vein or a fingerprint.

5. A method for selecting enrollment data for biometric identification, the method comprising:
    detecting feature data including a feature of a part of a living body at a plurality of positions in a range defined in advance in a real space when the part of the living body moves in the range to acquire enrollment data, wherein the feature data is linked to position data relating to the plurality of the positions in the range and to posture data about a posture of the part of the living body at the plurality of positions while detection by a processor;

arranging a specified number of hyperspheres in a comparison range defined in advance in a feature space along a line defined by a locus of the living body in the real space, wherein the feature space is spanned by a coordinate specifying a position of the part of the living body in the real space and a variable specifying the posture of the part of the living body, and the collation range includes a space corresponding to the range in the real space and a space corresponding to a space covered by the posture detected by the sensor, such that the hyperspheres run over the comparison range, do not overlap one another, and have maximum radii by the processor;

selecting the feature data detected at one of the positions in the real space closest to the position corresponding to the center of one of the hyperspheres as the enrollment data with top priority by the processor.

6. The method according to claim 5, wherein
the part of the living body is a hand vein or a fingerprint.

7. A method for selecting enrollment data for biometric identification, the method comprising:

detecting feature data including a feature of a part of a living body at a plurality of positions in a range defined in advance in a real space when the part of the living body moves in the range to acquire enrollment data, wherein the feature data is linked to position data relating to the plurality of the positions in the range and to posture data about a posture of the part of the living body at the plurality of positions while detection by a processor;

converting the position data and the posture data into coordinates in a feature space, wherein the feature space is spanned by a coordinate specifying a position of the part of the living body in the real space and a variable specifying the posture of the part of the living body by the processor, arranging a specified number of hyperspheres in a comparison range defined in advance in the feature space along a line defined by a locus of the living body in the real space, wherein the comparison range includes a space corresponding to the range in the real space and a space corresponding to a space covered by the posture detected by the sensor, such that the hyperspheres run over the collation range, do not overlap one another, and have maximum radii by the processor;

selecting the feature data detected at one of the positions in the real space closest to the position corresponding to the center of one of the hyperspheres as the enrollment data with top priority by the processor; and comparing the feature data with enrollment data relating to the part of the living body of the hypersphere by the processor.

8. The method according to claim 7, wherein
a passage rate that is defined by a rate at which a locus drawn for user authentication by a movement of a part of the living body in the comparison range is included inside the hypersphere is calculated, and it is determined that the part of the living body is to be moved again within the comparison range for user authentication when the passage rate is lower than a specified value.

9. The method according to claim 7, wherein
the part of the living body is a hand vein or a fingerprint.

10. A method for selecting a enrollment pattern for biometric identification, the method comprising:

calculating a minimum value of a distance between a position of a part of a living body along a locus of the part of the living body and a boundary of a comparison range that is set in advance, wherein the position having a distance from the boundary of the comparison range greater than a predetermined length by a processor;

obtaining a length of a line segment that is obtained in the manner in which a straight line, the straight line having a constant value r of a minimum value of the distance to the boundary of the collation range, is cut by a curve giving the minimum value using a relationship between the position and the minimum value of the distance from the position to the boundary of the comparison range by the processor;

acquiring the radii of the hypersphere from a relationship between a relationship between the position and the minimum value of the distance from the position to the boundary of the collation range, and the value of $1/(2m-2)$, where m is the number of arranged spheres by the processor;

arranging the m hyperspheres along the locus such that the hyperspheres run over the comparison range, and do not overlap one another by the processor r;

calculating the center point of the m hyperspheres by the processor; and selecting the feature data detected at the position of the real space closest to the position of the real space corresponding to the center point of one of the hyperspheres as the enrollment data by the processor.

11. The method according to claim 10, wherein
the part of the living body is a hand vein or a fingerprint.

* * * * *